UNITED STATES PATENT OFFICE.

ROLAND L. ANDREAU, OF WILMINGTON, DELAWARE, ASSIGNOR TO E. I. DU PONT DE NEMOURS & COMPANY, OF WILMINGTON, DELAWARE, A CORPORATION OF DELAWARE.

PROCESS OF MAKING SUBSTANTIALLY ANHYDROUS ORGANIC ACIDS.

1,381,782. Specification of Letters Patent. Patented June 14, 1921.

No Drawing. Application filed October 31, 1919. Serial No. 334,847.

*To all whom it may concern:*

Be it known that I, ROLAND L. ANDREAU, a citizen of the United States, and a resident of Wilmington, in the county of New Castle and State of Delaware, have invented a certain new and useful Process of Making Substantially Anhydrous Organic Acids, of which the following is a specification.

This invention relates to the making of substantially anhydrous organic acids by reactions between substantially anhydrous materials, and provides for the making of such acids without the necessity of concentrating the product of the reaction between a salt of the organic acid and a stronger acid. While I describe the invention with more particular reference to the making of acetic acid by the reaction between sodium acetate and sulfuric acid, it will be evident that the invention is not limited thereto, but on the contrary, is applicable to the making of other organic acids by the reaction between a salt of the organic acid desired and a stronger acid.

In processes heretofore in use for the production of acetic acid by the decomposition of an acetate by a stronger acid, e. g. sulfuric, it has not been feasible to use 100% sulfuric acid. This was because it was difficult to handle the generally thick and sticky reacting mass, and the concentrated acid decomposed some of the acetic acid. It has been the practice to avoid the difficulties attending the use of concentrated sulfuric acid by using a more or less dilute sulfuric acid, a practice which gives an acetic acid of not more than about 80% strength. For glacial acetic acid manufacture such a procedure requires of course subsequent concentration of the comparatively weak acetic acid obtained, and it is well known that the concentration of such acid to a strength of 99–100% requires considerable work as well as expensive apparatus. Examples of these processes are the treating of commercial calcium acetate, or sodium acetate, with dilute sulfuric acid, where in each case the product has to be concentrated. It has been proposed to use acetic acid as a diluent during the reaction but, here too, the sulfuric acid used for the decomposition of the acetate must not be 100% in strength, for if it is it will decompose some of the acetic acid. I have devised a process whereby the glacial substantially 100% acid can be made directly, using substantially anhydrous materials, and whereby various difficulties of previous processes are avoided, the yield being substantially 100% of the theoretical.

One object of the invention is to provide a process for the making of substantially anhydrous organic acids from substantially anhydrous materials.

Another object is to provide a process for the making of substantially anhydrous organic acids by the reaction between a salt of the acid and a stronger acid, both being used in a substantially anhydrous state.

Another object is to provide a process for the making of substantially anhydrous acetic acid by the reaction between an acetate and a stronger acid, both being used in a substantially anhydrous state.

Another object is to provide a process for the making of substantially anhydrous acetic acid by the reaction between an acetate and sulfuric acid, both being used in a substantially anhydrous state.

To these ends, and also to improve generally upon processes of the character indicated, my invention consists in the following matters hereinafter described and claimed.

Briefly stated, my invention involves the feature of carrying on the reaction between the salt of the organic acid and the stronger acid, in the presence of a substantially anhydrous non-volatile liquid inert with respect to the salt, the stronger acid, and the organic acid. A quantity of this liquid sufficient to give a certain degree of fluidity to the reacting mass is used, the quantity being sufficient to obviate caking, difficult stirring, local overheating, and like difficulties, which would result in the decomposing of some of the organic acid by the stronger acid. By doing this I am able to use substantially anhydrous materials for the reaction, and so can get a substantially anhydrous product. The product of the reaction is, preferably, immediately removed from the reacting mass, the fluidity of the same aiding in this, thereby avoiding any possibility of the product being acted upon by the acid used. Proceeding in this way, I can, for example, produce substantially anhydrous acetic acid, yield substantially 100% of the theoretical, by the reaction between a substantially anhydrous acetate, say sodium acetate, and substantially 100% sulfuric acid. That is, absolutely anhydrous materials can be used, except for the providing of a very small amount of water, say 1% of the weight of the acetate used, in order to ionize the acid used. For an inert liquid I have used, with highly satisfactory results, an anhydrous neutral paraffin oil, i. e., a saturated hydrocarbon oil of the methane series, having, of course, a boiling point, say 250° C., above any temperature reached during the carrying on of the process. By an "inert" liquid I mean, of course, a liquid not acted on by the reacting materials, by the product or by the liquid used for ionizing.

For example, in the preparation of glacial acetic acid, the procedure is preferably as follows:

Substantially anhydrous sodium acetate which can be obtained easily by drying or fusing, is pulverized into a fine powder, about #60 mesh, and suspended in neutral paraffin oil which has been deprived of any unsaturated compounds by shaping with sulfuric acid, washing and drying. Using any suitable still, provided with a mechanical agitation and a condenser, concentrated sulfuric acid, having a strength of about 100% $H_2SO_4$ is introduced slowly in theoretical quantity into the oil and acetate, taking care that the mass is kept thoroughly mixed during the introduction of the acid. A double decomposition takes place very smoothly and without secondary decomposition, with formation of substantially anhydrous acetic acid and of sodium sulfate, which remains in suspension in the oil in a finely divided state. There being no caking the acetic acid is distilled over immediately. With a sufficiently reduced pressure, say 630 mm. of mercury or less, the heat of the reaction is almost sufficient to distil all the acetic acid over, at, say, about 100° C., but additional heat may be supplied if necessary. Of course, and as will be understood by those skilled in the art, such pressures and temperatures may be used as desired, as say about 120° C., or more, at atmospheric pressure.

When the distillation is completed, and nothing but oil and sodium sulfate remain in the still, water is introduced in sufficient quantity to dissolve all the sodium sulfate, forming a concentrated solution which settles in the bottom of the still while the oil remains on top. The sodium sulfate solution is decanted and utilized in any desired way, the oil is heated, say in the still, to a temperature above the boiling point of water until the water is driven off and the oil is anhydrous. The operation may be repeated indefinitely as there is practically no loss of oil during the process.

Various proportions of materials can be used, the following proportions, molecular as regards the acetate and sulfuric acid, being recommended:

Anhydrous sodium acetate _____ 164 pounds
Sulfuric acid, 100% $H_2SO_4$ ____ 98 pounds
Paraffin oil _____ 50 gallons As will be understood, a very small amount of water, or other liquid not decomposed in the reaction and in which the sulfuric acid will ionize, sufficient to cause ionization of the sulfuric acid, should also be used. It may be supplied in any suitable way as by having the acetate or acid not quite absolutely anhydrous. It is convenient to use sodium acetate which is not absolutely anhydrous but contains, say, 1% by weight of water, which I find provides sufficient water, allowance for this water being made by, say, the use of a weight of non-anhydrous acetate sufficient to give 164 pounds of anhydrous acetate; though it will be understood that the proportions of acetate and acid do not have to be exactly adhered to, but departure from molecular proportions being generally uncalled for. The amount of oil may be varied between wide limits, the point being to use enough oil to give a degree of fluidity to the mass sufficient to obviate caking, local overheating, difficult stirring, etc. The yield is substantially theoretical i. e. with the above weights, substantially 120 pounds of acetic acid, in a practically anhydrous state; e. g. the distillate being of about 95% strength or better.

I claim:

1. The process of making acetic acid which consists in suspending an acetate in a paraffin oil, adding sulfuric acid, and removing the acetic acid formed by the reaction of the acetate and the sulfuric acid.

2. The process which consists in suspending an acetate of an element forming a water-soluble sulfate, in a paraffin oil, adding sulfuric acid, distilling the acetic acid formed by the reaction of the acetate and the sulfuric acid, adding water to dissolve the sulfate formed by the reaction, and separating the water and sulfate from the oil.

3. The process of making substantially anhydrous acetic acid which consists in suspending sodium acetate, containing substantially 1% of water, in substantially 50 gallons of a paraffin oil per 164 pounds of anhydrous sodium acetate, adding substantially 98 pounds of substantially anhydrous sulfuric acid per 164 pounds of anhydrous sodium acetate, and distilling the acetic acid formed by the reaction of the actetate and the sulfuric acid.

4. The process of making an organic acid by the reaction between a salt thereof and sulfuric acid, while using the salt and the sulfuric acid in substantially anhydrous condition thereby to directly produce the organic acid in substantially anhydrous condition, which process comprises suspending the salt in a sufficient amount of a substantially anhydrous paraffin oil to give a degree of fluidity to the mass, adding the sulfuric acid, and removing the organic acid formed by the reaction.

In testimony whereof I affix my signature.

ROLAND L. ANDREAU.